July 21, 1964 R. W. REACH, JR 3,141,961
INFORMATION HANDLING APPARATUS
Filed Sept. 21, 1960
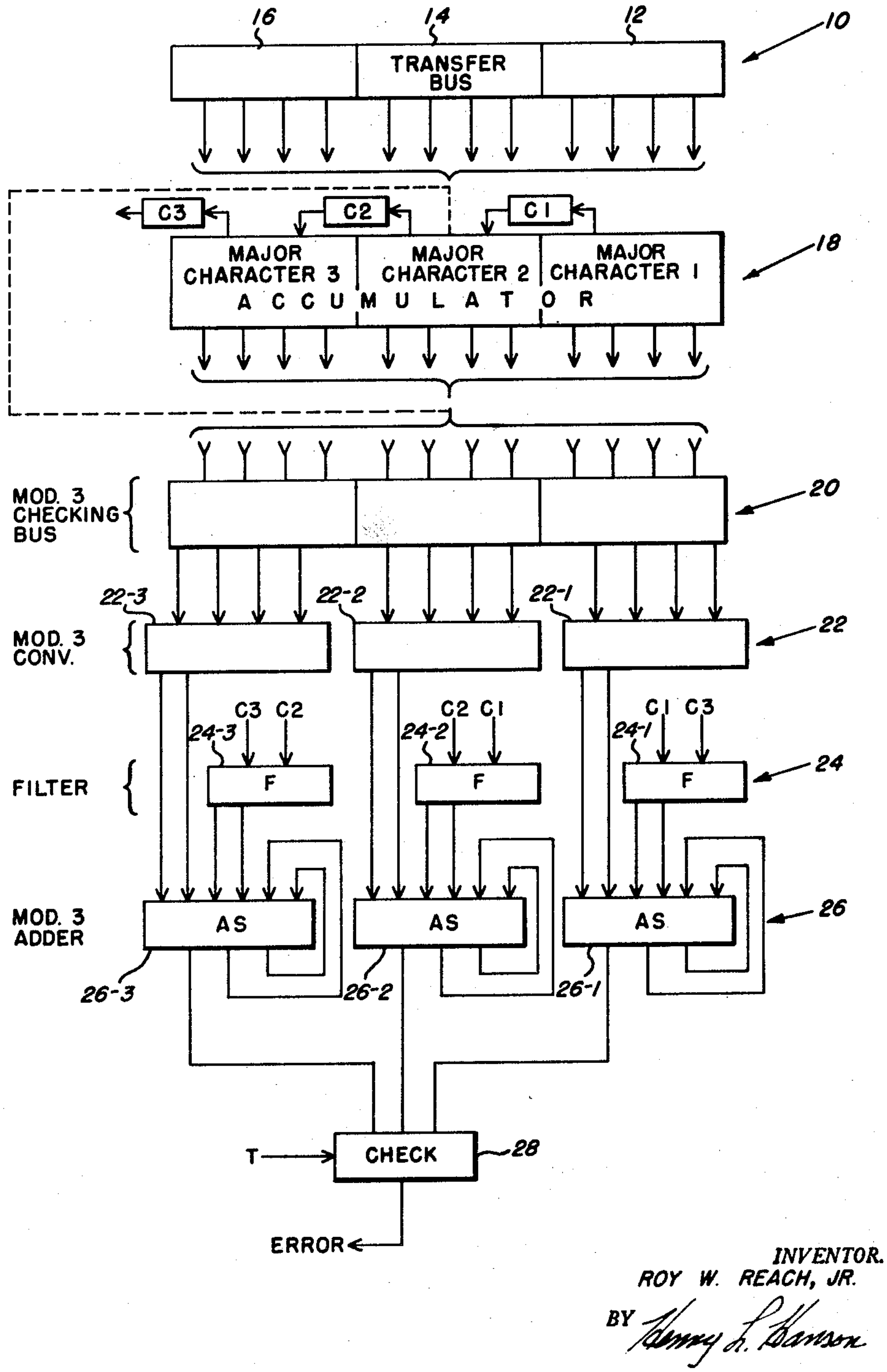
INVENTOR.
ROY W. REACH, JR.
BY Henry L. Hanson
ATTORNEY United States Patent Office 3,141,961
Patented July 21, 1964

3,141,961

INFORMATION HANDLING APPARATUS

Roy W. Reach, Jr., Sudbury, Mass., assignor to Minneapolis-Honeywell Regulator Company, Minneapolis, Minn., a corporation of Delaware Filed Sept. 21, 1960, Ser. No. 57,496
9 Claims. (Cl. 235—153)

A general object of the present invention is to provide a new and improved checking apparatus for a data processing system. More specifically, the present invention is concerned with a new and improved checking apparatus for a data processing system useful particularly in the area of checking the arithmetic processes of the system including addition, subtraction, multiplication, shifting, comparison, masking and the like, wherein such operations take place within the arithmetic unit of the system.

In a copending application of the present inventor and William M. Kahn bearing Serial Number 843,719, filed October 1, 1959, and issued October 10, 1961, as No. 3,003,695, there is disclosed a new type of adder circuit which has been termed a parallel-serial-parallel adder. This adder circuit is one which makes optimum use of the speed advantages to be gained by serial manipulation of data. While such adders may be built with very reliable components and the incidence of error due to signal transience and component failure is very small, it is nevertheless desirable to provide for the checking of such an adder to ensure that when an error occurs, the error is detected substantially immediately. To check such an adder, it is desired that any checking which is done be done at a rate which will not impede the speed of operation of the data processing system and, in particular, the adder. Thus, any checking done should be done concurrently with the operation of the adder to ensure that the data processing is not held up waiting for a check to be accomplished.

It is therefore another more specific object of the present invention to provide a new and improved checking circuit for an arithmetic unit of the type incorporating parallel-serial-parallel data manipulation circuitry.

In accordance with the principles of the present invention, the data handled by the data processing system is on the basis of words, each of which is individually defined in a preselected arrangement of "ones" and "zeros" representing binary numbers, binary coded decimal numbers, or binary coded alpha-numeric characters. For example, each of these words may be arranged on a major character basis wherein each major character represents one-third of the total bits of the entire word. As pointed out in the above-mentioned copending application, the adding operation is carried out on a major character basis with appropriate provision being made for intercharacter carries or borrows as may be necessary for the arithmetic process involved.

In accordance with the principles of the present invention, it has been found that the optimum way of checking the arithmetic process is to perform the check on a major character basis. By performing the check in this particular manner, the check can be accomplished in a time which will not deter the over-all operating speed of the system, and the power of the check in its ability to detect errors is greatly increased over other known checking schemes for the reason that portions of the entire machine word are individually checked by a highly accurate checking scheme which greatly enhances the ability of the checking circuit to detect all single errors and gives a very high degree of checking reliability under multiple error conditions.

Still another object of the present invention is then to provide a new and improved checking circuit for a parallel-serial-parallel adder wherein the words of information manipulated are broken into individual major characters with the checking operation being made with respect to the major characters of each word.

A still further more specific object of the invention is to provide a new and improved checking circuit for a data manipulator for a data processing word wherein a checking operation is performed in a predetermined modulus on a major character basis with respect to each word wherein each major character represents only a portion of the word being manipulated.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

In a preferred embodiment of the invention, the data manipulated was arranged in words of uniform or fixed length. Each such word contained 48 bits of information in the form of a binary code or binary coded decimal representation. Each 48-bit word was then divided into three major characters, each of which was 16 bits in length. Each major character was then manipulated as a separate entity except for a situation wherein a carry is propagated into or out of this 16-bit major character.

In terms of timing, each major character is manipulated on a parallel-serial basis. Thus, the 16-bit character is manipulated in terms of four 4-bit minor characters, each minor character of which is arranged to follow in time sequence the preceding four bits. Thus, each major character may be arranged to pass a particular point in a data manipulating circuit in four timing or clock pulse periods. The adder circuit specifically described in the aforementioned application is representative of the type of data manipulating circuit with which the present invention is adapted to be used. Pictorially, the data may be arranged in tabular form, as illustrated below in Table 1, wherein the minor and the major characters are arranged in the format directly related to the normal flow of data during an operation.

TABLE 1

| | | | | | | | | | | | |
|---|---|---|---|---|---|---|---|---|---|---|---|
| 48 | 47 | 46 | 45 | 32 | 31 | 30 | 29 | 16 | 15 | 14 | 13 |
| 44 | 43 | 42 | 41 | 28 | 27 | 26 | 25 | 12 | 11 | 10 | 9 |
| 40 | 39 | 38 | 37 | 24 | 23 | 22 | 21 | 8 | 7 | 6 | 5 |
| 36 | 35 | 34 | 33 | 20 | 19 | 18 | 17 | 4 | 3 | 2 | 1 |
| Major character 3 | | | | Major character 2 | | | | Major character 1 | | | |

Referring to the foregoing table, it will be noted that the information bits 1 through 16 are identified as major character 1, the bits 17 through 32 are identified as major character 2, and the bits 33 through 18 are identified as major character 3. When this is related to the apparatus illustrated in the single figure of the drawing, it will be noted that information manipulated will be manipulated in accordance with the separate major character divisions covered in the table.

Referring more specifically to the drawing, there is indicated at 10 a transfer bus having three seperate sections 12, 14 and 16. Each section is arranged to have four separate outputs for handling the minor character portions which make up the over-all major character. As further illustrated in the drawing, the transfer bus 10 is arranged to feed information to an accumulator 18, the latter of which may take the form of the aforementioned copending application.

Each transfer of data out of the transfer bus 10 will be a parallel transfer of the twelve bits made up of the corresponding four bits of each of the major characters shown in Table 1. Thus, for example, the first transfer from the bus 10 will be information bits 1, 2, 3 and 4 (from major character 1), 17, 18, 19 and 20 (from major character 2) and 33, 34, 35 and 36 (from major character 3). The next transfer in time will be the next four bits from each of the major characters. This transfer process, sometimes referred to as a parallel-serial-parallel transfer, will continue until all 48 bits of the incoming word have been transferred. As soon as the first operand, or 48 bits, has been transferred, a second operand may be transferred by way of the same transfer bus, as outlined above.

The output of the transfer bus 10, as well as the accumulator 18, is arranged for connection into the modulo 3 check bus 20. The general functioning of the mod 3 checking bus is to receive the incoming operands related to the manipulation being performed as well as the result in the accumulator at the appropriate time and then deliver this data, or its complement, as the manipulation may require as more specifically set forth below, directly to the modulo 3 converter circuitry 22. The flow of information through this checking bus corresponds to the data flow on the input transfer bus 10 so that the output is set up to deliver a 48-bit word (parallel-serial-parallel) twelve bits at a time in three major characters for four successive pulse periods.

In other words, the mod 3 checking bus will function as a transfer bus for incoming data from the bus 10 or, after the accumulator 18 has completed its operation, as a transfer bus for the output of the accumulator. The transfer may be by way of conventional transfer gates which will provide for the selective connection of output leads from the bus 10 to the converter 22, or by way of a further set of gates which will couple the complement of the output of the accumulator 18 to the converter 22. The actual circuitry for effecting this transfer may take the form illustrated and described in chapter 3 of the R. K. Richards book entitled "Arithmetic Operations in Digital Computers," 1955, D. Van Nostrand Co., Inc. Reference may also be made to chapter 4 of the same book for the basic principles and logical circuitry associated with binary addition and subtraction.

The modulo 3 converters indicated at 22 are each separate and distinct converter circuits 22–1, 22–2 and 22–3. Each of the converters is associated with one of the major characters such as set forth above in Table 1. The construction of the three converters is the same and each will be seen to comprise four inputs and two outputs. In this way, a binary coded hexadecimal digit representing the four parallel transferred bits of each major character may be applied to the four inputs of each converter and the converter will provide at the output the correct modulo 3 value of the input. Thus, the first four input bits, or hexadecimal digit, input to the converter section 22–1 will be the bits 1, 2, 3 and 4 from major character 1. Similarly, the first four input bits, or hexadecimal digit, input to the converter section 22–2 will be the bits 17, 18, 19 and 20 from major character 2. Further, the first four input bits, or hexadecimal digit, input to the converter section 22–3 will be the bits 33, 34, 35 and 36 from major character 3. More specifically, the mod 3 converters 22 are arranged to have input and output signals represented in Table 2 following.

TABLE 2

| Hexadecimal Input | Mod 3 Binary Output | Mod 3 Value |
|---|---|---|
| DCBA | FE | |
| 0000 | 00 | 0 |
| 0001 | 01 | 1 |
| 0010 | 10 | 2 |
| 0011 | 00 | 0 |
| 0100 | 01 | 1 |
| 0101 | 10 | 2 |
| 0110 | 00 | 0 |
| 0111 | 01 | 1 |
| 1000 | 10 | 2 |
| 1001 | 00 | 0 |
| 1010 | 01 | 1 |
| 1011 | 10 | 2 |
| 1100 | 00 | 0 |
| 1101 | 01 | 1 |
| 1110 | 10 | 2 |
| 1111 | 00 | 0 |

Also associated with the checking circuitry are the filtering circuits 24 which are arranged to have as inputs intermajor character carry signals, as well as carry signals that may be generated within the modulo 3 adders of the combination. Three separate filtering circuits, 24–1, 24–2 and 24–3, are associated with each of the three respective major characters.

The final portion of the checking circuitry comprises the mod 3 adding circuitry which takes the form of three separate adding circuits 26–1, 26–2 and 26–3. These modulo 3 adder circuits function to total all of the incoming modulo 3 values from the corresponding converters and filters, and they store the modulo 3 value of the respective sums. The aforementioned Richards book illustrates typical adding circuitry incorporating storage or accumulating facilities, noting in particular chapter 4.

The over-all operation of the checking circuitry relative to the checking of the arithmetic operations of addition and subtraction may be understood by an analysis of the mathematics relating to this checking function. Thus, given the equation $A+B=R$, it is desired that the checking circuitry produce an indication of an error in the event that an error occurs. This may be done by taking the modulo 3 values of the A operand and adding it to the modulo 3 value of the B operand. The modulo 3 sum of the result should correspond to the modulo 3 sum of the A and B operands. This may be expressed by the following equation:

$$(1)\qquad (A)_3+(B)_3=(R)_3$$

Similarly, if a subtraction process should take place within the circuitry, the checking of this operation may be made by appropriately equating the modulo 3 difference of the A and B operands with the modulo 3 value of the result. The equation for this may be as follows:

$$(2)\qquad (A)_3-(B)_3=(R)_3$$

The foregoing Equations 1 and 2 may be expressed in a form such that if there is a proper check, the result will be zero. Thus, Equation 3 may be used to represent Equation 1, and Equation 4 may be used to represent Equation 2:

$$(3)\qquad (A)_3+(B)_3+(\overline{R})_3=0$$

$$(4)\qquad (A)_3+(\overline{B})_3+(\overline{R})_3=0$$

Inasmuch as the modulo 3 checking of the arithmetic operation is performed on a major character basis, it is necessary that intermajor character carries be taken into consideration in order to completely validate the check. Thus, the check equations must include signals representing a carry-in and a carry-out of the major character. In this regard, let the following terms be considered:

$Ci$=carry into major character,
$Co$=carry out from major character,
$bi$=borrow into major character,
$bo$=borrow out from major character.

Utilizing the foregoing terms, Equations 3 and 4 are modified and will take the form of Equations 5 and 6 respectively:

$$(5)\qquad (A)_3+(B)_3+(Ci)_3+(\overline{Co})_3+(\overline{R})_3=0$$

$$(6)\qquad (A)_3+(B)_3+(\overline{bi})_3+(bo)_3+(\overline{R})_3=0$$

The operation of the circuitry of the drawing may be considered with reference to the foregoing equations when they are applied to the individual major character divisions of the checking circuitry. The general circuit operation may best be understood by reference to the following example wherein a simple addition is performed. Thus, an A operand and a B operand are arranged to be added in the accumulator and the sum will appear at the output of the accumulator. In the checking operation, the low order four bits in each major character is applied both to the accumulator and to the mod 3 checking bus. The mod 3 checking bus transfers the hexadecimal number to the associated mod 3 converter 22 which will reduce the hexadecimal number to a modulo 3 number. The resultant modulo 3 numbers from the converters 22 are then appropriately added in the modulo 3 adders 26. After the A and B operands have been applied to the accumulator, the result will appear at the output. The result will be transferred, in complemented form, to the checking circuit for adding, on a modulo 3 basis, with the sums already in the adders 26. The final result of the addition in the modulo 3 adders 26 should be zero if the addition has been performed without error. Example 1 below illustrates the steps performed with respect to each of the major characters as the data is transferred and added within the checking circuitry. It will be noted in the example, that the operations relative to each of the major characters 1, 2 and 3 are going on in parallel or simultaneously while the individual operations relative to each number in each major character are considered in time sequence. Further, the A operand is acted upon first in the time sequence followed by the B operand and then the resultant operand. It will be noted that in each of the mod 3 adders 26, the result at the end of the checking process is a zero.

*Example 1 (Addition)*

| | | | |
|---|---|---|---|
| A operand | 4 7 6 9 | 8 3 2 5 | 6 1 7 2 |
| B operand | 3 1 2 6 | 2 0 3 4 | 2 8 6 1 |
| Result | 7 8 9 6 | 0 3 5 9 | 9 0 3 3 |

MAJOR CHARACTER #1

| Check | Input Mod 3 Check Bus | Hexadecimal Form | Output Mod 3 Converter | Output Mod 3 Adder 26-1 |
|---|---|---|---|---|
| | 2 | 0010 | 10 | 10 |
| | 7 | 0111 | 01 | 00 |
| | 1 | 0001 | 01 | 01 |
| | 6 | 0110 | 00 | 01 |
| | 1 | 0001 | 01 | 10 |
| | 6 | 0110 | 00 | 10 |
| | 8 | 1000 | 10 | 01 |
| | 2 | 0010 | 10 | 00 |
| | −3 | 1100 | 00 | 00 |
| | −3 | 1100 | 00 | 00 |
| | −0 | 1111 | 00 | 00 |
| | −9 | 0110 | 00 | 00 (Final) |

MAJOR CHARACTER #2

| Check | Input Mod 3 Check Bus | Hexadecimal Form | Output Mod 3 Converter | Output Mod 3 Adder |
|---|---|---|---|---|
| | 5 | 0110 | 10 | 10 |
| | 2 | 0010 | 10 | 01 |
| | 3 | 0011 | 00 | 00 |
| | 8 | 1000 | 10 | 00 |
| | 4 | 0100 | 01 | 01 |
| | 3 | 0011 | 00 | 01 |
| | 0 | 0000 | 00 | 01 |
| | 2 | 0010 | 10 | 00 |
| | −9 | 0110 | 00 | 00 |
| | −5 | 1010 | 01 | 01 |
| | −3 | 1100 | 00 | 01 |
| | −0 | 1111 | 00 | 01 |
| (carry out) | −1 | 1110 | 10 | 0 (Final) |

MAJOR CHARACTER #3

| Check | Input Mod 3 Check Bus | Hexadecimal Form | Output Mod 3 Converter | Output Mod 3 Adder |
|---|---|---|---|---|
| (Carry in) | 1 | 0001 | 01 | 01 |
| | 9 | 1001 | 00 | 01 |
| | 6 | 0110 | 00 | 01 |
| | 7 | 0111 | 01 | 10 |
| | 4 | 0100 | 10 | 00 |
| | 6 | 0110 | 00 | 00 |
| | 2 | 0010 | 10 | 10 |
| | 1 | 0001 | 01 | 00 |
| | 3 | 0011 | 00 | 00 |
| | −6 | 1001 | 00 | 00 |
| | −9 | 0110 | 00 | 00 |
| | −8 | 0111 | 01 | 01 |
| | −7 | 1000 | 10 | 00 (Final) |

The foregoing example is but one of a number of different checking operations that can be performed using the techniques set forth herein.

The actual logical implementation of the circuitry of the drawing will, of course, depend upon the operations that are to be performed by the circuitry. Insofar as the logic required for the basic arithmetic checking is concerned, the modulo 3 converters 22 may each have their logic arranged for implementing the conversion set forth in Table 2. Thus, with four inputs A, B, C and D, and outputs GF1 and GF2, the two required logical or Boolean statements are as follows:

$$(7)\quad GF1 = A\bar{B}\bar{C}\bar{D} + \bar{A}\bar{B}C\bar{D} + ABC\bar{D} + \bar{A}B\bar{C}D + A\bar{B}CD$$

$$\overline{GF2} = A\bar{B}\bar{C}\bar{D} + \bar{A}\bar{B}C\bar{D} + ABC\bar{D} + \bar{A}B\bar{C}D + A\bar{B}CD$$

$$(8)\quad GF2 = \bar{A}B\bar{C}\bar{D} + A\bar{B}C\bar{D} + \bar{A}\bar{B}\bar{C}D + AB\bar{C}D + \bar{A}BCD$$

$$\overline{GF1} = \bar{A}B\bar{C}\bar{D} + A\bar{B}C\bar{D} + \bar{A}\bar{B}\bar{C}D + AC\bar{B}D + \bar{A}BCD$$

Insofar as the logic of the filters 24 is concerned, it should be kept in mind that these filters function to compensate the mod 3 value of the result on a major character basis when there is an intermajor character carry occurring during an arithmetic operation. This filter circuitry must then keep track of whether or not there is an addition or a subtraction being performed and also whether or not there is a carry-out or carry-in in an addition operation or a borrow-in or borrow-out during a subtraction operation. For purposes of expressing the logic required, the character Z may be used to represent whether or not an addition is being performed such that if $Z=1$, addition is being performed, and if $Z=0$, a subtraction is being performed. The carry-out and borrow-in function may be represented by the symbol $K_L$, while the carry-in and borrow-out function may be represented by the symbol $K_R$. The output from the filter stages leads may thus be represented by the symbols $FL_1$ and $FL_2$, having the respective weights of $2^0$ and $2^1$ respectively. The equations for $FL_1$ and $FL_2$ may then be represented as in the Equations 9 and 10 below:

$$(9)\qquad FL_1=\overline{ZK}_RK_L+ZK_R\overline{K}_L$$

$$(10)\qquad FL_2=\overline{Z}K_R\overline{K}_L+Z\overline{K}_RK_L$$

Referring to the drawing, it will be noted that the mod 3 adder circuits each have six input terminals and two output terminals. For purposes of logical analysis of the circuitry required for implementing the modulo 3 adders, the outputs from the mod 3 converters, which form two of the inputs, may be assigned the designations GF1 and GF2, having the binary significance of $2^0$ and $2^1$ respectively. The outputs from the filters, which form two additional inputs, are designated as $FL_1$ and $FL_2$, and have the binary significance of $2^0$ and $2^1$ respectively. The outputs of the adders are recirculated, under certain conditions, so that the outputs may be designated AS1 and AS2, said outputs having the binary significance of $2^0$ and $2^1$ respectively. The Boolean equations for implementing this adder logic then become as represented below in Equations 11 and 12. In the equations, the function RMA is present and may be considered as a recirculation function which is adapted to be used under certain circumstances when the contents of the adder circuit are to be stored.

$$(11)\quad AS1(2^0) = AS1\cdot\overline{GF1}\cdot\overline{GF2}\cdot\overline{FL_1}\cdot\overline{FL_2}\cdot\overline{RMA}$$
$$+\overline{AS1}\cdot\overline{AS2}\cdot\overline{GF1}\cdot\overline{FL_1}\cdot\overline{RMA}$$
$$+AS2\cdot\overline{GF2}\cdot FL_2\cdot\overline{RMA}$$
$$+\overline{AS1}\cdot\overline{AS2}\cdot GF1\cdot\overline{RMA}$$
$$+AS2\cdot GF2\cdot\overline{RMA}$$
$$+AS1\cdot RMA$$

$$(12)\quad AS2(2') = AS2\cdot\overline{FL_2}\cdot\overline{FL_1}\cdot\overline{GF2}\cdot\overline{GF1}\cdot\overline{RMA}$$
$$+\overline{AS2}\cdot\overline{AS1}\cdot FL_2\cdot\overline{GF2}\cdot\overline{RMA}$$
$$+\overline{AS1}\cdot\overline{AS2}\cdot GF2\cdot\overline{RMA}$$
$$+AS1\cdot GF1\cdot\overline{RMA}$$
$$+AS2\cdot RMA$$

Note that above, $$(GF1+GF2)\cdot(FL_1+FL_2)\equiv 0$$
$$GF1\cdot GF2=FL_1\cdot FL_2=AS1\cdot AS2\equiv 0$$

A control signal for stopping the computer, if desired, may be produced by the checking circuit as indicated generally at 28. In its very basic form, the checking circuit may take the form of a buffer circuit which is appropriately clocked at the desired check time to determine if any one of the modulo 3 adder circuits 26 are set at zero in both stages of each adder circuit. If any stage is not set at zero, at the completion of an arithmetic operation when the check is to be performed, an error signal may be passed to an appropriate indicator or automatic system shut-down circuit.

The foregoing description and analysis is applicable to arithmetic operations of addition or subtraction of either pure binary information or binary coded decimal information.

The principles of the present invention are also applicable to other arithmetic processes that may be performed. Such further functions include such functions as shifting, multiplication, comparisons, masking and the like. In accordance with the principles outlined above, appropriate algorithms and Boolean statements may be readily developed to provide for the necessary modifications of the checking bus 20 and the filtering circuits 24 so that the necessary compensations can be made which directly relate to the function being performed. Regardless of what the actual process may be, the power of the checking is preserved by providing a multiple check on each word when considered on the major character basis outlined above.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for checking the operation of a data processing system having a parallel-serial-parallel adder adapted to manipulate a multi-bit word of information in terms of a plurality of multi-bit major characters comprising a plurality of separate multi-bit major character adders each of which is simultaneously operating modulo $n$, where $n$ is less than the number of bits in each major character, gating means connecting each input operand applied to the parallel-serial-parallel adder to said plurality of major character adders, and means connecting the output of said parallel-serial-parallel adder to said plurality of major character adders.

2. Apparatus for checking the operation of a data processing system having a parallel-serial-parallel adder adapted to manipulate a multi-bit word of information in terms of a plurality of multi-bit major characters comprising a plurality of separate multi-bit major character adders, gating means connecting each input operand applied to the parallel-serial-parallel adder to said plurality of major character adders, and means connecting the output of said parallel-serial-parallel adder to said plurality of major character adders.

3. Apparatus for checking the operation of a data processing system having a parallel-serial-parallel data manipulator adapted to manipulate multi-bit operands of information in terms of a plurality of multi-bit major characters comprising a plurality of multi-bit major character adders, gating means connecting each input operand applied to the parallel-serial-parallel data manipulator to said plurality of major character adders, means connecting the output of said parallel-serial-parallel data manipulator to said plurality of major character adders, and error indicating means connected to said major character adders.

4. In combination, a parallel-serial-parallel adder circuit having a plurality of parallel input operand receiving terminals adapted to transmit data to said adder as separate major characters of information at the same time, a plurality of separate major character adder circuits, each of which is adapted to add the input thereto modulo $n$, means connecting the input operands to said parallel-serial-parallel adder to said plurality of separate major character adder circuits, and means connecting the outputs of said parallel-serial-parallel adder to said plurality of major character adder circuits.

5. In combination, a parallel-serial-parallel data manipulating circuit having a plurality of parallel input operand receiving terminals adapted to transmit data to said adder as separate major characters of information at the same time, a plurality of major character adder circuits, each of which is adapted to add the input thereto modulo $n$, means connecting the input operands to said parallel-serial-parallel circuit to said plurality of major character adder circuits, means connecting the outputs of said parallel-serial-parallel circuit to said plurality of major character adder circuits, and means connected to said plurality of major character adder circuits to compensate for intermajor character data flow in said parallel-serial-parallel circuit.

6. In combination, a parallel-serial-parallel adder circuit having a plurality of parallel input operand receiving terminals adapted to transmit data to said adder as separate major characters of information at the same time, a plurality of separate major character adder circuits, each of which is adapted to add the input thereto modulo $n$, means connecting the input operands applied to said parallel-serial-parallel adder to said plurality of major character adder circuits, means connecting the outputs of said parallel-serial-parallel adder to said plurality of major character adder circuits, and means connected between said parallel-serial-parallel adder circuit and said plurality of major character adder circuits to compensate for any major character carry effected during an adding operation.

7. Apparatus for checking the operation of a data manipulator operating in the parallel-serial-parallel mode comprising a data input bus adapted to transfer data to said data manipulator divided into separate major characters, each composed of a plurality of sequentially occurring multi-bit minor characters, the latter being applied in parallel to said manipulator input, a checking bus, a modulo $n$ converter, a plurality of modulo $n$ accumulators, means connecting the output of said input bus and said manipulator to said checking bus, means including said modulo $n$ converter connecting said checking bus to said plurality of modulo $n$ accumulators, and error sensing means connected to the output of said accumulators.

8. In combination, a data manipulator operating in the parallel-serial-parallel mode, a data input bus adapted to transfer data to said data manipulator divided into separate major characters, each composed of a plurality of sequentially occurring multi-bit minor characters, the latter being applied in parallel to said manipulator input, a checking bus, a modulo $n$ converter, a plurality of modulo $n$ accumulators, means connecting the output of said input bus and said manipulator to said checking bus, means including said modulo $n$ converter connecting said checking bus to said plurality of modulo $n$ accumulators, intermajor character transfer sensing means connected between said manipulator and said accumulators to compensate the accumulations in said accumulators, and error sensing means connected to the output of said accumulators.

9. In combination, a digital data adder operating in the parallel-serial-parallel mode, a data input bus adapted to transfer data to said data manipulator divided into separate major characters, each composed of a plurality of sequentially occurring multi-bit minor characters, the latter being applied in parallel to the input of said adder, a checking bus, a modulo $n$ converter, a plurality of modulo

*n* accumulators, means connecting the output of said input bus and said adder to said checking bus, means including said modulo *n* converter connecting said checking bus to said plurality of modulo *n* accumulators, carry sensing means connected to said adder to sense any carry between major characters in said adder, means connecting said carry sensing means to the inputs of said accumulators to compensate for carry signals in said adder, and error sensing means connected to the output of said accumulators.

References Cited in the file of this patent

Gilchrist et al.: Fast Carry Logic for Digital Computers, IRE Transactions—Electronic Computers, vol. EC–4, No. 4, December 1955.